United States Patent
Carlson et al.

(10) Patent No.: US 9,679,447 B2
(45) Date of Patent: Jun. 13, 2017

(54) MATERIAL HANDLING VEHICLE WITH PRODUCT PLACEMENT INDICATION

(71) Applicant: The Raymond Corporation, Greene, NY (US)

(72) Inventors: Kenneth W. Carlson, Muscatine, IA (US); David J. Sweeney, Durant, IA (US); Donald Garvey, Granite Falls, NC (US); Gregory Kosar, Hickory, NC (US); Daniel R. Driscall, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 65 days.

(21) Appl. No.: 14/607,388

(22) Filed: Jan. 28, 2015

(65) Prior Publication Data

US 2015/0213695 A1   Jul. 30, 2015

Related U.S. Application Data

(60) Provisional application No. 61/932,391, filed on Jan. 28, 2014.

(51) Int. Cl.
| | | |
|---|---|---|
| *G08B 21/00* | (2006.01) | |
| *G08B 5/00* | (2006.01) | |
| *B62B 3/06* | (2006.01) | |
| *B65G 1/137* | (2006.01) | |

(52) U.S. Cl.
CPC .................. *G08B 5/00* (2013.01); *B62B 3/06* (2013.01); *B65G 1/1375* (2013.01); *B65G 2209/04* (2013.01); *B65G 2209/06* (2013.01)

(58) Field of Classification Search
CPC ...................................................... G08B 5/00

USPC ........... 340/540, 691.1, 691.4, 815.4, 815.45
See application file for complete search history.

(56) References Cited

U.S. PATENT DOCUMENTS

| | | |
|---|---|---|
| 5,812,986 A | 9/1998 | Danelski |
| 6,650,225 B2 | 11/2003 | Bastian, II et al. |
| 7,195,156 B2 | 3/2007 | Venema et al. |
| 7,516,848 B1 | 4/2009 | Shakes et al. |
| 8,170,712 B2 | 5/2012 | Battles et al. |
| 8,423,431 B1 | 4/2013 | Rouaix et al. |
| 2002/0070846 A1 | 6/2002 | Bastian, II et al. |
| 2004/0247421 A1 | 12/2004 | Saunders et al. |
| 2006/0206235 A1 | 9/2006 | Shakes et al. |

FOREIGN PATENT DOCUMENTS

| | | |
|---|---|---|
| DE | 102007019455 A1 | 11/2008 |
| EP | 0933281 A1 | 8/1999 |

OTHER PUBLICATIONS

International Search Report and Written Opinion; Appln. No. PCT/US2015/013224; dated May 6, 2015; 12 pages.
DE 102007019455; English Abstract.
EP0933281; English Abstract.

*Primary Examiner* — Jeffery Hofsass
(74) *Attorney, Agent, or Firm* — Quarles & Brady LLP

(57) ABSTRACT

Visual indication systems and methods are provided. A material handling vehicle includes at least a first product placement location and a second product placement location. At least one visual indicator provides a visual indication at or near the first product placement location or the second product placement location. The visual indication serves as a visual confirmation for the order picker to place a product in a specific predefined placement location.

21 Claims, 5 Drawing Sheets

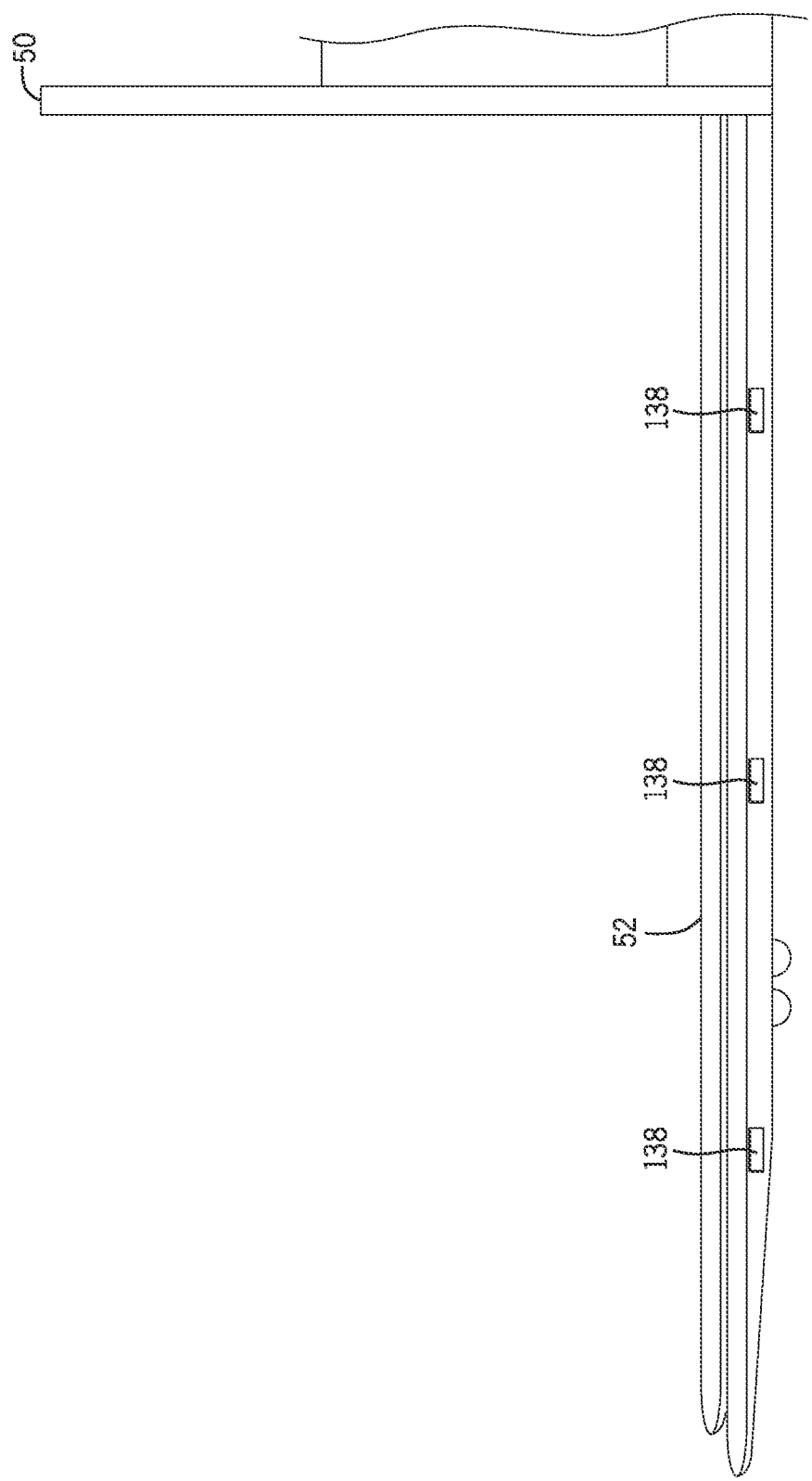

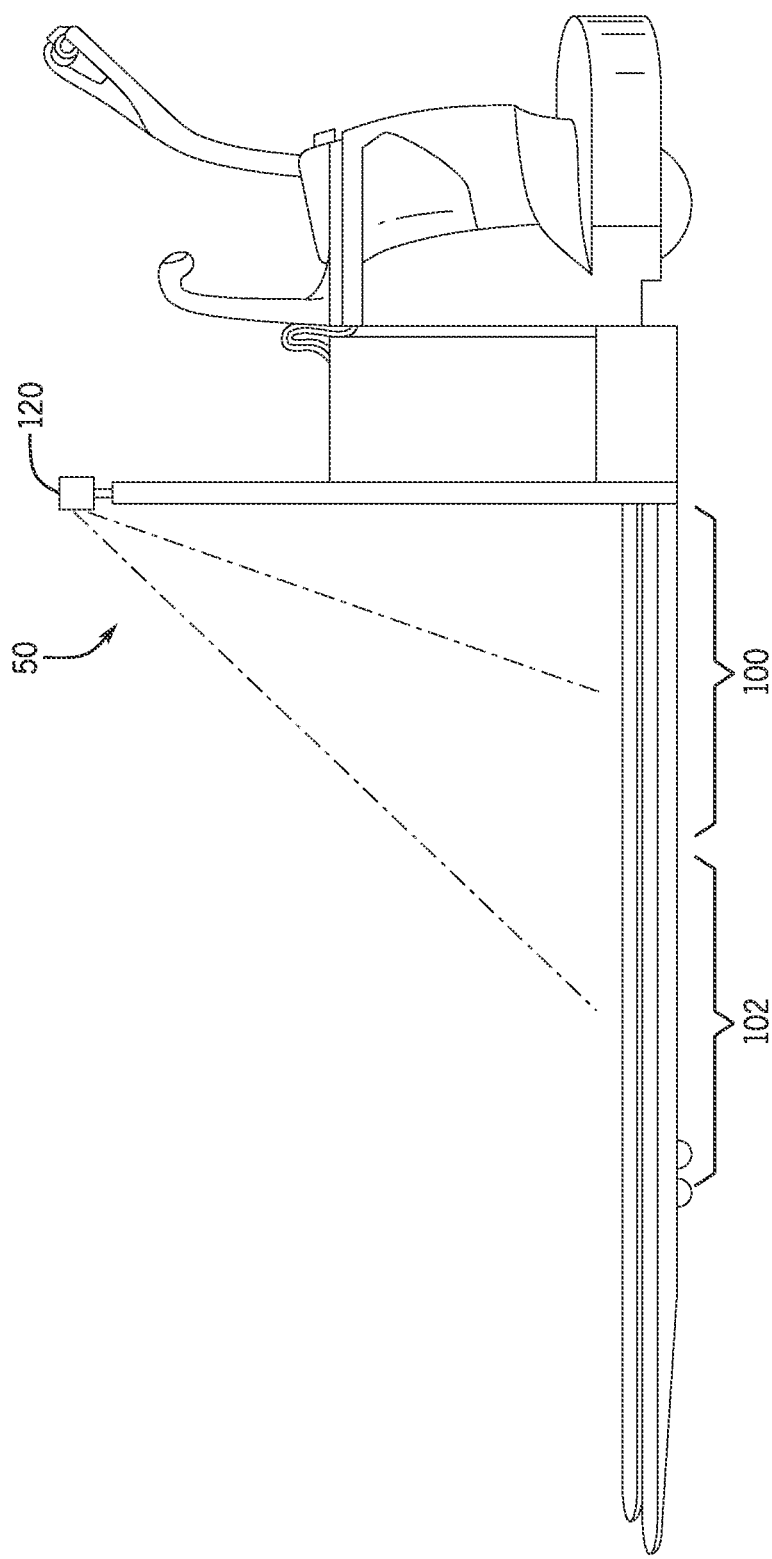

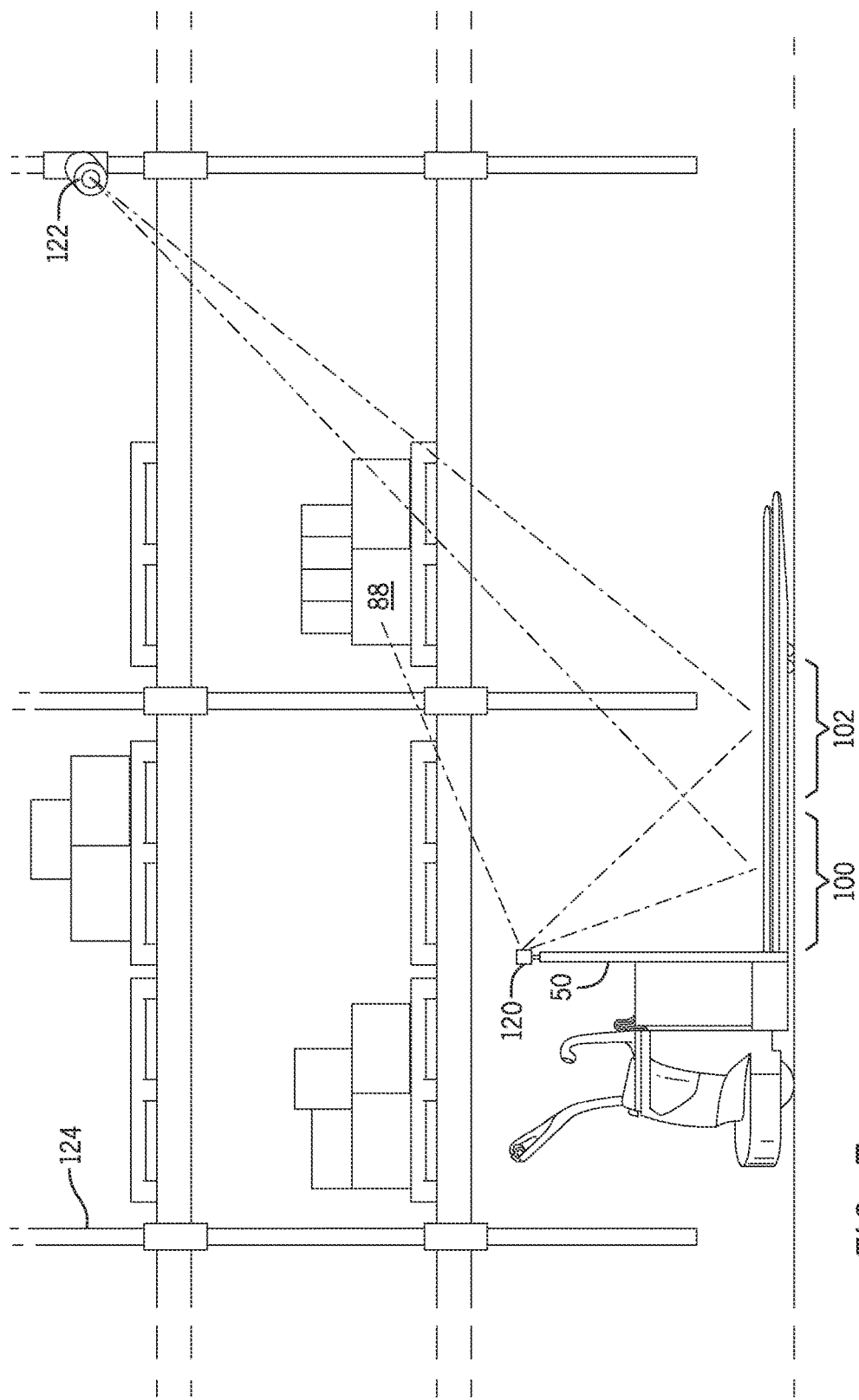

MATERIAL HANDLING VEHICLE WITH PRODUCT PLACEMENT INDICATION

CROSS-REFERENCE TO RELATED APPLICATIONS

This application claims the benefit of U.S. Provisional Patent Application Ser. No. 61/932,391, filed Jan. 28, 2014, and entitled "Material Handling Vehicle With Product Placement Indication," which is hereby incorporated by reference.

STATEMENT CONCERNING FEDERALLY SPONSORED RESEARCH OR DEVELOPMENT

Not applicable.

FIELD OF THE INVENTION

The present invention relates to the field of material handling vehicles, and more specifically to material handling vehicle that provides a visual indication for a product placement.

BACKGROUND OF THE INVENTION

Material handling vehicles are designed in a variety of configurations to perform a variety of tasks. These types of vehicles are commonly used in a warehouse or a factory to transport, store, and retrieve materials and finished goods.

Material handling vehicles are used to temporarily hold and transport products picked from shelves by an order picker to fill a customer order. The products are typically stored on shelves in a rack system in which a plurality of unit loads of many products are stored. Each unit load, generally, contains a single type of product, and a customer typically requires one or more boxes of product picked from many different unit loads. This requires the order picker to travel up and down one or more aisles of the rack system to pick products from many different locations in the rack system to fill the customer's order. Typically, each product picked by the operator is placed on a load platform on the vehicle.

In some applications, the load platform on the vehicle includes more than one predefined placement location for picked products. Each predefined placement location can be used for a specific customer, and the specific customer's picked goods are placed on the platform in the specific customer's predefined placement location.

The vehicle used in this type of application is commonly referred to as an order picker truck. The order picker truck can include a load platform, typically a set of forks, that are sized sufficiently long so two or more pallets can be placed on the forks or held by the forks generally side-by-side along the length of the forks. The order picker receives instructions that indicate what product to pick for a specific customer, and what pallet to place the product on, for the specific customer.

The instructions to the order picker are either written, e.g., on a pick sheet or on a display screen on the vehicle, or are audio, e.g., the operator can wear a hands-free headset controlled by a warehouse management system that can provide an audio instruction. Both of these forms of instruction require the order picker to remember what specific predefined placement location is for a specific customer.

With two or more predefined placement locations on the load platform, it is easy for the order picker to mistake one placement location for any of the others, or to forget which predefined placement location corresponds to the written or audio indication.

In an order picking application, the result of putting the product in the wrong placement location is twofold. The customer that did not order the product, but received it anyway, will most likely keep the product that they did not pay for. Then, the customer that did order the product, but did not get the product with their order, may be dissatisfied and request a fast turnaround on correctly completing the order. In some cases, future business with the customer may be affected.

Another option has been to put picked product for the same customer on all of the predefined placement locations on the load platform, i.e., one vehicle for one customer. This reduces the errors created by placing the product in the wrong placement location, but it also reduces productivity. The order picker spends more time traveling from pick location to pick location and this travel time is not productive.

What is needed is an indication system that solves the problems associated with providing instructions to an order picker.

SUMMARY OF THE INVENTION

Embodiments of the present invention overcome the drawbacks of previous systems and methods by providing one or more visual indicators that indicate the predefined placement location on the load platform where the product is to be placed. When the order picker picks a product to be placed onto the load platform, a visual indicator can indicate on, at, or near which predefined placement location the order picker is to place the picked product. The visual indication serves as a visual confirmation for the order picker to place a product in a specific predefined placement location for a specific customer delivery/shipment. An advantage of this technology compared to prior methods is increased productivity without increased error.

In accordance with one embodiment of the invention, a visual indication system is disclosed. The system comprises a material handling vehicle, the material handling vehicle including at least a first product placement location on a load platform and a second product placement location on the load platform; and at least one visual indicator, the at least one visual indicator to provide a visual indication on, at, or near the at least the first product placement location and the second product placement location.

In accordance with another embodiment of the invention, a visual indication system is disclosed. The system is for use on a material handling vehicle, the material handling vehicle including at least a first product placement location on a load platform and a second product placement location on the load platform, the second product placement area being different than the first product placement area, the load platform including at least a first aperture and a second aperture. The system comprises at least a first visual indicator and a second visual indicator, the at least the first visual indicator and the second visual indicator to be coupled to the load platform, the at least the first visual indicator to provide a first visual indication on, at, or near the first product placement location and the second visual indicator to provide a second visual indication on, at, or near the second product placement location; and the at least the first visual indicator to provide the first visual indication through the first aperture, and the second visual indicator to provide the second visual indication through the second aperture.

In accordance with another embodiment of the invention, a method is disclosed. The method comprises instructing a visual indicator on a material handling vehicle to provide a visual indication to be visible on, at, or near a first specific placement location on a load platform of the material handling vehicle or a second specific placement location on the load platform of the material handling vehicle, the second product placement area being different than the first product placement area.

It is to be appreciated that any of the various features described herein can be combined with some or all of the other features described herein according to alternate embodiments.

The foregoing advantages of the invention will appear in the detailed description which follows. In the description, reference is made to the accompanying drawings which illustrate preferred embodiments.

BRIEF DESCRIPTION OF THE DRAWINGS

FIG. 5 is a side view of a material handling vehicle similar to FIG. 1 and showing a load platform with three apertures usable with visual indicators, in accordance with embodiments of the present invention;

FIG. 6 is a perspective view of an alternative visual indication system usable with the material handling vehicle of FIG. 1, in accordance with embodiments of the present invention; and FIG. 7 is a perspective view of an additional alternative visual indication system usable with the material handling vehicle of FIG. 1, in accordance with embodiments of the present invention.

Figure 1:
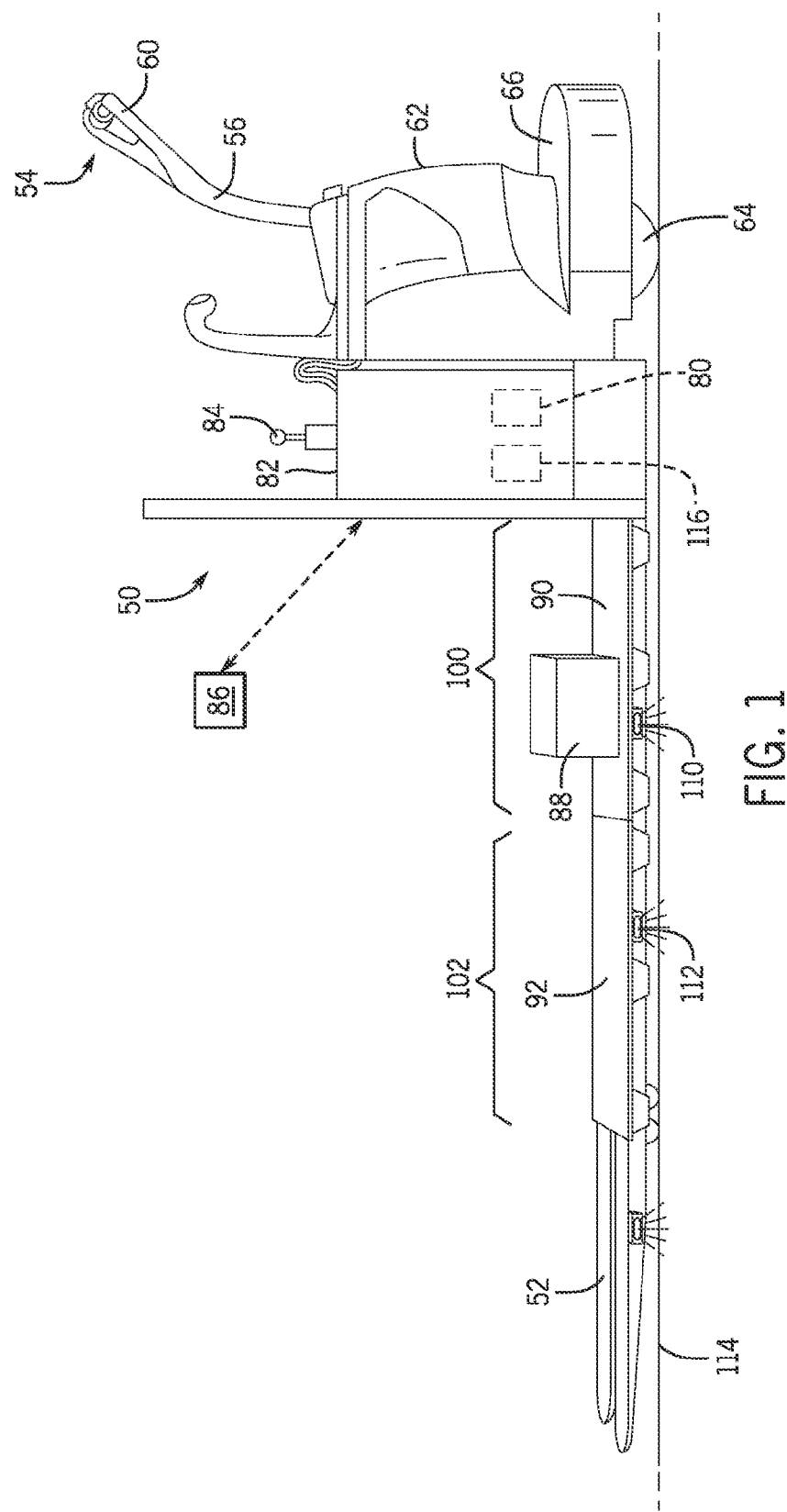
FIG. 1 is a perspective view of a material handling vehicle that has components operable to provide visual indication to an order picker in accordance with embodiments of the present invention.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF THE PREFERRED EMBODIMENT

The invention will now be described more specifically with reference to the following embodiments. It is to be noted that the following embodiments are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "connected" and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically. Thus, although schematics shown in the figures depict example arrangements of processing elements, additional intervening elements, devices, features, or components may be present in an actual embodiment.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to implement aspects detailed herein.

As used herein, the terms "processor" and "controller" may include one or more processors and memories and/or one or more programmable hardware elements. As used herein, the terms "processor" and "controller" are intended to include any types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which configuration data and programs may be stored and/or data communications may be buffered. The term "memory" may also include other types of known or future developed memory or combinations thereof.

The various aspects of the invention will be described in connection with visual indicators that visually indicate on, at, or near a specific predefined placement location on the load platform where the selected product is to be placed. That is because the features and advantages that arise due to embodiments of the invention are well suited to this purpose. Still, it should be appreciated that the various aspects of the invention can be applied to other vehicles and to achieve other objectives as well.

It is to be appreciated that material handling vehicles are designed in a variety of configurations to perform a variety of tasks. Although the vehicle 50 is shown by way of example as a hand/rider truck, it will be apparent to those of skill in the art that the embodiments are not limited to vehicles of this type, and can also be provided with various other types of vehicle configurations, including for example, vans, semi trucks, pickup trucks, pallet trucks, stacker trucks, fore-aft stance operator lift trucks, reach trucks, high-lift trucks, counterbalanced trucks, and swing-reach trucks, as non-limiting examples. The systems and methods described herein are suitable for both driver controlled, pedestrian controlled and remotely controlled material handling vehicles, along with non-motorized carts or load platforms that are manually pushed by an order picker.

Referring now to the Figures, and more particularly to FIG. 1, one embodiment of a material handling vehicle 50 that incorporates the present invention is shown. A hand/rider order picking vehicle 50 is depicted having a load platform 52 that can be vertically movable between a lower position and an upper position. Typically, the load platform 52 would comprise load bearing forks, although not required. The vehicle 50 also includes a steering control mechanism 54 that can include a movable steering arm 56 and steering arm handle 60. The vehicle 50 is also provided with a motor housing 62 and a steerable drive tire 64 located under a platform 66.

The vehicle 50 can also include a vehicle controller 80 that receives operator input signals and, based on the received signals, provides command signals to each of a lift motor (not shown) and a drive system (not shown) that includes the drive tire 64. The vehicle 50 and vehicle controller 80 can be powered by one or more battery(s) 82 to provide motive and control power.

In some embodiments, an antenna 84 for wireless communications with a known external warehouse management system 86 can be coupled to the vehicle 50 and in some embodiments can be connected to the vehicle controller 80 to provide bidirectional communications from the vehicle 50 to the warehouse management system. The communications link may be implemented by a connection through the Internet, a Wi-Fi system, or various other known wireless links.

The warehouse management system 86 can comprise software that is executed on a computer and operable to communicate with the vehicle 50. By providing simple connections and a standard protocol, systems and methods of the present technology are adaptable for use with a number of different warehousing systems.

In the exemplary vehicle shown, the load platform 52 can be sized such that one or more pallets can be placed on the load platform 52 in a known fashion. It is to be appreciated that any known pallet types may be used. In this example, a first pallet 90 and a second pallet 92 are shown on the load platform 52. The first pallet 90 represents a predefined placement location, e.g., a first product placement location 100, and the second pallet 92 represents another predefined placement location, e.g., a second product placement location 102. It is to be appreciated that the first pallet 90 and the second pallet 92 are not required. The load platform 52 can be any configuration able to support the placement of picked products. In addition, more than two specific pallet or placement locations are possible, or a combination of pallet and placement locations.

In the context of this example, the vehicle operator will also be considered the order picker. The order picker will pick a product, for example off of a shelf, and place the picked product 88 on one of the first pallet 90 or the second pallet 92 (shown placed on the first pallet 90). It is to be appreciated that the order picker does not need to be the vehicle operator. The technology allows anyone who picks a product to more accurately place the product in a specific placement location.

In one embodiment, the vehicle 50 can include a first visual indicator 110 located on, at, or near the first product placement location 100 and a second visual indicator 112 located on, at, or near the second product placement location 102. The position of the first visual indicator 110 and the second visual indicator 112 can be adjustable to accommodate variations in size or shape or position of the first product placement location 100 and the second product placement location 102. In some embodiments, the visual indicators 110 and/or 112 can comprise an LED or an incandescent bulb, or a laser, as non-limiting examples, to provide illumination. In the embodiments shown, the visual indicator 110 can project illumination onto the floor 114 at or near the first product placement location 100, and the visual indicator 112 can project illumination onto the floor 114 at or near the second product placement location 102. It is to be appreciated that the visual indicators 110 and 112 can project illumination in any desired direction or location on the vehicle or on the floor, or both, that would be visible by the order picker, including away from the floor and parallel to the floor, for example, so that the order picker can see which product placement location is indicated. In this context, near is intended to indicate within a range that the order picker would understand the indication was specific to one product placement location and not another specific product placement location.

Figure 2:
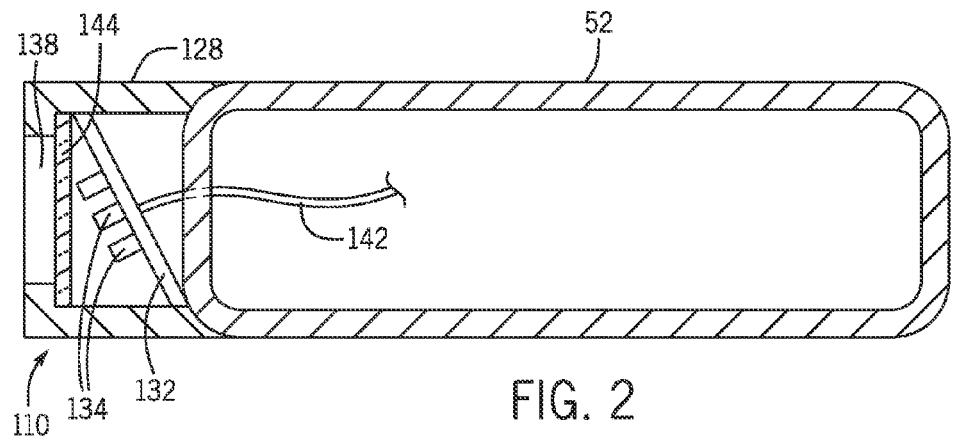
FIGS. 2 and 3 are cross-section views of embodiments of brackets mounted to a load platform, with the bracket supporting a visual indicator, in accordance with embodiments of the present invention.
Figure 3:
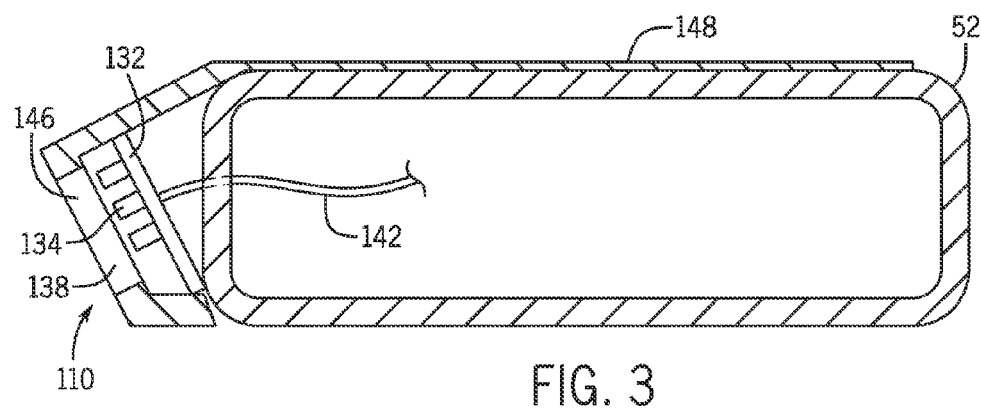

Referring to FIGS. 2 and 3, in some embodiments, the visual indicators 110 and 112 can be coupled to the load platform 52. As seen in the cross-sectional view of FIG. 2, in one embodiment, visual indicator 110 comprises a bracket 128 coupled to the load platform 52. Although visual indicator 110 is shown and described, it is to be appreciated that multiple visual indicators 110, 112, or more (as would be used in FIG. 5) could be used. A single bracket 128 can be used that includes visual indicators 110, 112 for example, or two brackets 128 could be used, one for visual indicator 110 and one for visual indicator 112. It is to be appreciated that the bracket 128 can be coupled to the load platform 52 in a variety of ways, including bolts, welding, or magnetic, as non-limiting examples. The bracket 128 may be removably coupled to the load platform 52 to allow the visual indicator 110 to be repositioned along the load platform to a desired position. Within the bracket 128, a circuit board 132 can be positioned that includes one or more LEDs 134 (three LEDs are shown). The circuit board 132 and LEDs 134 can be positioned within the bracket 128 to project illumination through aperture 138 so the illumination shines on the ground 114, or elsewhere, as described above. Control wiring 142 can extend from the circuit board 132 through the bracket or through the load platform 52, or both, back to the controller 80 or visual indicator controller 116 discussed in greater detail below. The visual indicator 110 can also be a wireless device, discussed in greater detail below. A mounting plate, glue, or clips, for example, (not shown) can also be used to position the circuit board 132 in the bracket 128.

In some embodiments, a shield 144 can be positioned over the aperture 138 to provide protection for the LEDs/circuit board. The shield 144 can be a thermoplastic polymer material for example, and can be glued to the bracket 128 to provide a seal. The shield 144 can include optic properties, such as providing a color to the illumination, or the shield 144 can be a lens or reflective element to enhance or focus the illumination, as non-limiting examples.

Referring to FIG. 3, in an additional embodiment similar to the embodiment shown in FIG. 2, visual indicator 110 comprises a bracket 148 coupled to the load platform 52. As seen in the cross-sectional view of FIG. 3, the bracket 148 (or more than one bracket 148) can extend over the load platform 52 to provide additional support. The bracket 148 can be removably coupled to the load platform in any of the same ways as described above for bracket 128. As seen, within the bracket 148, circuit board 132 can be positioned that includes one or more LEDs 134. The circuit board 132 and LEDs 134 can be positioned within the bracket 148 to project illumination through aperture 138 so the illumination shines on the ground 114, or elsewhere, as described above. Control wiring 142, if used, can extend from the circuit board 132 through the load bracket or through the load platform 52, or both, back to the controller 80 or visual indicator controller 116. A mounting plate, glue, or clips, for example, (not shown) can also be used to position the circuit board 132. In the embodiment shown in FIG. 3, aperture 138 can be filled with a protective material 146, such as a thermoplastic polymer material, and again may serve to provide optic properties, such as providing a color to the illumination, or the protective material 146 can be a lens or reflective element to enhance or focus the illumination, as non-limiting examples. In some embodiments, a shield 144 and protective material 146 can be used.

Figure 4:
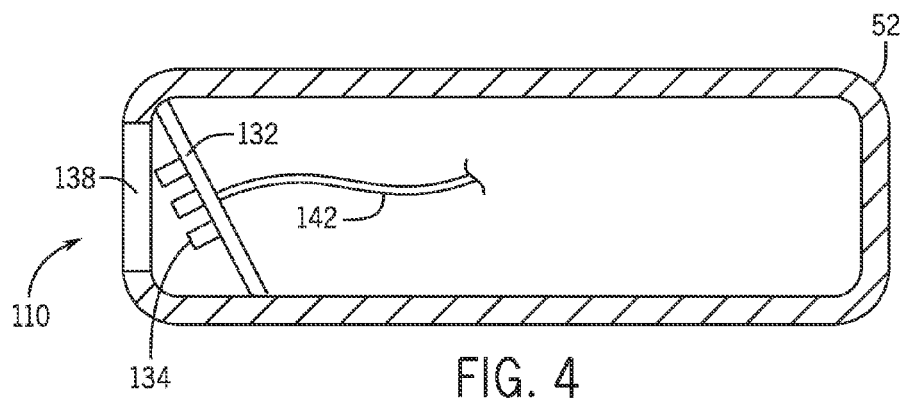
FIG. 4 is a cross-section view of a load platform, with the load platform supporting a visual indicator, in accordance with embodiments of the present invention.

Referring to FIG. 4, in an additional embodiment, visual indicator 110, including the circuit board 132 and LEDs 134, can be positioned within the load platform 52. The circuit board 132 and LEDs 134 can be positioned within the load platform 52 to project illumination through aperture 138 so the illumination shines on the ground 114, or elsewhere, as described above. Control wiring 142, if used, can extend from the circuit board 132 through the load platform 52 back to the controller 80 or visual indicator controller 116. A mounting plate, glue, or clips, for example, (not shown) can also be used to position the circuit board 132. The circuit board 132 and associated LEDs 134 can be user adjustable and replaceable in any of the embodiments.

Similar to the embodiments shown in FIGS. 2 and 3, aperture 138 can be filled with a protective material 146, such as a thermoplastic polymer material, and again may serve to provide optic properties, such as providing a color to the illumination, or the protective material 146 can be a lens or reflective element to enhance or focus the illumination, as non-limiting examples. In some embodiments, shield 144 and protective material 146 can be used.

FIG. 5, shows a side view, similar to FIG. 1, and shows three apertures 138. These apertures can be from any of the embodiments described above, including bracket 128, bracket 148, or load platform 52, or any combination of embodiments.

In the embodiments described above, the brackets 128 and 148 can be mounted on either side, e.g., inside or outside, or both sides of the load platform 52. As would be understood by one of skill in the art, when the load platform 52 comprises one or more forks of a material handling vehicle, the brackets 128 and 148 can be mounted on either side or both sides of the forks. Similarly, with the embodiment shown in FIG. 4, apertures 138 can be positioned on either side or both sides of the load platform 52, and when the load platform 52 comprises one or more forks, the apertures 138 can be positioned on either side or both sides of the forks.

In other embodiments, the visual indicators can be coupled to or installed within the first pallet 90 and/or the second pallet 92 in such a way as project illumination visible by the order picker.

In other embodiments where an illumination may be less easily seen, one or both visual indicators 110 and 112 can comprise a physical device such as a sign or shape that can be controlled to appear and disappear at or near the specific placement location.

When the order picker picks a product, one of the visual indicators 110 or 112 can provide a visual indication to the order picker of the predefined placement location, e.g., either the first pallet 90 or the second pallet 92, on the load platform 52 where the product is to be placed. In some embodiments, the visual indicators 110 and 112 can each comprise the same color, or can each comprise a unique color. For example, a first color can correspond to the first pallet 90, and a second color can correspond to the second pallet 92. Each unique color can correspond with the specific placement location where the product is to be placed. For example, if a red visual indicator 110 is illuminated at or near the first pallet 90, then the product is to be placed on the first pallet 90. If a green visual indicator 112 is illuminated at or near the second pallet 92, then the product is to be placed on the second pallet 92.

The visual indication serves as a visual confirmation to the order picker to place the picked product in the predefined placement location for a specific customer delivery/shipment.

In use, the warehouse management system can assign two or more customers to a single vehicle 50, although other methods of assigning a customer to a vehicle are possible. One or more predefined placement locations on the vehicle, e.g., first and/or second product placement locations 100 and 102, can be assigned to a single customer. For example: a first customer can be assigned to the first product placement location 100 on the load platform 52, and a second customer can be assigned to the second product placement location 102 on the load platform 52.

The warehouse management system 86 can provide an instruction(s) to the order picker to pick a new product for the first customer. After receiving the instruction, the order picker can pick the product from the rack, and then can notify the warehouse management system that the product has been picked and is ready to be placed on the load platform 52. In some embodiments, the act of picking a product can automatically notify the warehouse management system 86 that the product was picked and ready to be placed. For example, RFID technology or a bar code scanner can transmit a notification to the vehicle 50 and/or the warehouse management system 86.

Once the product has been picked and the warehouse management system is aware that the product has been picked, the warehouse management system 86 can then send an instruction, e.g., a signal, to the controller 80 on the vehicle 50. The controller 80 can then provide a signal to any of the visual indicators to provide an indication, e.g., to illuminate, the specific placement location for the picked product 88. In this example, the controller 80 can provide a signal to visual indicator 110 to illuminate so the order picker knows to place the picked product 88 on the first pallet 90 instead of the second pallet 92. The warehouse management system can also update the product inventory and/or update a bill of material for the specific customer, as non-limiting examples.

In some embodiments, the controller 80 can send a signal to a visual indicator controller 116. The visual indicator controller 116 can be electrically coupled to the battery 82, and using power from the battery 82, the visual indicator controller can control battery power to any of the visual indicators 110, 112. In other embodiments, the warehouse management system can send the signal directly to the visual indicator controller 116. Yet in other embodiments, the visual indicators can be battery powered wireless devices. Any of the warehouse management system 86, the controller 80 and/or the visual indicator controller 116 can wirelessly control the operation of the visual indicators 110, 112. In some embodiments, the controller 80 and the visual indicator controller 116 comprise a single device.

Once the order picker has placed the picked product 88 into the specific product placement area for that specific picked product, in this example the first product placement location 100, the order picker can send a command to the warehouse management system 86 that the order pick is complete. In some embodiments, the act of placing the product in the product placement location 100, or on the load platform 52, for example, can automatically generate a command to the warehouse management system that the order pick is complete. At this point, the warehouse management system can send a signal to the controller 80, or to the visual indicator controller 116, to turn off the visual indicator 110. The visual indicator controller 116 can then remove power from the visual indicator 110 and a new pick sequence can begin.

It is to be appreciated that product placement data can be downloaded to the vehicle 50 and stored in memory. In this way, the communication with the warehouse management system 86 can be eliminated for each picked product, and instead, the order picker can communicate with the vehicle controller 80, for example.

Referring to FIG. 6, in other embodiments, the visual indicator an comprise an illumination device 120 coupled to the vehicle 50. The illumination device 120 can be controlled in the same manner as described for visual indicators 110, 112, for example. The illumination device 120 can project an illumination, e.g., a laser beam or other illumination, to provide a visual indication on, at, or near the specific placement location where the picked product is to be placed. Any of the warehouse management system 86, the controller 80 and/or the visual indicator controller 116 can wirelessly control the operation of the illumination device 120.

In yet another embodiment, the illumination device 120 can also be controlled to provide an illumination of the pick location on the shelving or rack that corresponds with the specific placement location on the load platform 52 for the product at the illuminated pick location.

Referring to FIG. 7, in yet another embodiment, a plurality of visual indicators such as illumination devices 122 can be placed throughout the warehouse, e.g., on the shelving or rack system 124, as a non-limiting example. As with the illumination device 120, the illumination devices 122 can be controlled in the same manner as described for visual indicators 110, 112, for example. The illumination devices 122 can be battery operated, or can be hard wired to a source of power. The illumination devices 122 can also be hard wired to the warehouse management system 86 for control of illumination, or the illumination devices 122 can be wirelessly controlled by any of the warehouse management system 86, the controller 80, or the visual indicator controller 116. The illumination devices 122 can project an illumination, e.g., a laser beam or other illumination, to provide a visual indication on, at or near the specific placement location where the picked product is to be placed.

In yet a further embodiment, a plurality of visual indicators can be positioned in the floor 114 and/or suspended from a ceiling, for example. The warehouse management system 86 can track a location of the vehicle 50, and based on a known location of the vehicle, any of the visual indicators can be instructed to provide an indication, e.g., to illuminate, the specific placement location for the picked product 88.

All of the embodiments described above, including the visual indicators and illumination devices described herein, can be used individually or in combination with each other.

The foregoing has been a detailed description of illustrative embodiments of the invention. Various modifications and additions can be made without departing from the spirit and scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate embodiments. While the preferred embodiment has been described, the details may be changed without departing from the invention, which is defined by the claims.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

We claim:

1. An visual indication system comprising:
   a material handling vehicle including a base unit and a load platform mounted relative to the base unit, the load platform including at least one fork being vertically movable between an upper position and a lower position;
   at least a first product placement location on the at least one fork and a second product placement location on the at least one fork; and
   at least one visual indicator, the at least one visual indicator to provide a visual indication on, at, or near the at least the first product placement location and the second product placement location.

2. The system according to claim 1, further including a controller, the controller to control operation of the at least one visual indicator.

3. The system according to claim 2, wherein the controller receives a wireless signal from a remote device, the wireless signal providing an instruction to the controller to operate the at least one visual indicator.

4. The system according to claim 1, wherein the at least one visual indicator projects an illumination on, at, or near the at least one fork to visually identify with the projected illumination one of the at least the first product placement location and the second product placement location.

5. The system according to claim 1, wherein the at least one visual indicator comprises a first visual indicator and a second visual indicator, the first visual indicator to provide a first visual indication on, at, or near the first product placement location and the second visual indicator to provide a second visual indication on, at, or near the second product placement location.

6. The system according to claim 5, wherein the first visual indicator and the second visual indicator are coupled to the at least one fork.

7. The system according to claim 6, wherein the at least one fork includes a first aperture for the first visual indicator to provide the first visual indication through, and a second aperture for the second visual indicator to provide the second visual indication through.

8. The system according to claim 1, wherein the at least one visual indicator comprises an illumination source.

9. The system according to claim 1, wherein the at least one visual indicator provides a visual indication for a product pick location.

10. The system according to claim 9, wherein the visual indication for the product pick location corresponds to one of the at least the first product placement location and the second product placement location.

11. An visual indication system for use on a material handling vehicle, the material handling vehicle including a base unit and a load platform mounted relative to the base unit, the load platform being vertically movable between an upper position and a lower position, at least a first product placement location on the load platform and a second product placement location on the load platform, the second product placement area being different than the first product placement area, the load platform including at least a first aperture and a second aperture, the system comprising:
- at least a first visual indicator and a second visual indicator, the at least the first visual indicator and the second visual indicator to be coupled to the load platform, the at least the first visual indicator to provide a first visual indication on, at, or near the first product placement location and the second visual indicator to provide a second visual indication on, at, or near the second product placement location; and
- the at least the first visual indicator to provide the first visual indication through the first aperture, and the second visual indicator to provide the second visual indication through the second aperture.

12. The system according to claim 11, wherein the load platform comprises at least one material handling vehicle fork.

13. The system according to claim 11, wherein the at least the first visual indicator comprises a first illumination source, and the second visual indicator comprises a second illumination source.

14. A method comprising:
receiving a wireless signal from a remote device; and
based on the wireless signal, providing a signal to a visual indicator on a material handling vehicle for providing a visual indication to be visible on, at, or near a first specific placement location on a load platform of the material handling vehicle or a second specific placement location on the load platform of the material handling vehicle, the second product placement area being different than the first product placement area, the material handling vehicle including a base unit and the load platform mounted relative to the base unit, the load platform being vertically movable between an upper position and a lower position.

15. The method according to claim 14, wherein the visual indicator is coupled to the load platform.

16. The method according to claim 14, wherein the load platform includes a first aperture and a second aperture, and the first visual indicator providing the first visual indication through the first aperture, and the second visual indicator providing the second visual indication through the second aperture.

17. The method according to claim 14, wherein the load platform comprises at least one material handling vehicle fork.

18. The method according to claim 14, wherein providing the visual indication to be visible on, at, or near the first or second specific product placement location includes projecting an illumination on, at, or near the load platform to identify the first or second specific product placement location.

19. The method according to claim 14, wherein a warehouse management system provides the wireless signal to the material handling vehicle.

20. The method according to claim 14, further including a controller, the controller controlling operation of the visual indicator.

21. The method according to claim 20, wherein a warehouse management system provides the wireless signal to the controller, and the controller providing the wireless signal to the visual indicator.

* * * * *